United States Patent [19]

Apffel

[11] Patent Number: 4,861,360
[45] Date of Patent: Aug. 29, 1989

[54] CARBON DIOXIDE ABSORPTION METHANOL PROCESS

[75] Inventor: Fred Apffel, Houston, Tex.

[73] Assignee: Flexivol, Inc., Houston, Tex.

[21] Appl. No.: 58,485

[22] Filed: Jun. 5, 1987

Related U.S. Application Data

[63] Continuation-in-part of Ser. No. 832,747, Feb. 24, 1984, Pat. No. 4,675,035.

[51] Int. Cl.⁴ .................................................. F25J 3/00
[52] U.S. Cl. .............................................. 62/17; 55/68; 62/20; 62/28
[58] Field of Search ................... 62/17, 20, 28; 55/68

[56] References Cited

U.S. PATENT DOCUMENTS 4,185,978  1/1980  McGalliard et al. .................. 62/28

Primary Examiner—Ronald C. Capossela
Attorney, Agent, or Firm—David M. Ostfeld

[57] ABSTRACT

A process is disclosed for the separation of hydrocarbon feed gas mixtures containing carbon dioxide. The process utilizes four distillation units and one absorption unit. The feed gas is fed to the first distillation system where the methane-and-lighter components are separated from the propane-and-heavier hydrocarbons. The top gas product from the first distillation unit is mixed with a portion of the absorbing medium methanol and refrigerated. This mixture is fed to the bottom of the absorber. The gas containing methane, ethane and carbon dioxide flows up the absorber countercurrent to the downcoming liquid methanol. The ethane and carbon dioxide are dissolved by the methanol and exit the bottom of the absorber as a liquid. The methane-and-lighter components are not dissolved by the methanol and leave the absorber as a gas. The bottoms from the first distillation system are fed to a second distillation column where the ethane and carbon dioxide are distilled as a top gas product. This gas mixture and the warmed bottoms from the absorber are fed to a third distillation unit. A small amount of methanol is mixed with the overhead vapor from this distillation unit. The methanol, a polar substance, causes the relativity of carbon dioxide to ethane to both invert. The ethane becomes the lighter component and is distilled from the top of the unit as a gas. The carbon dioxide and methanol bottoms product are fed to a fourth distillation unit where the carbon dioxide is distilled from the methanol.

29 Claims, 4 Drawing Sheets

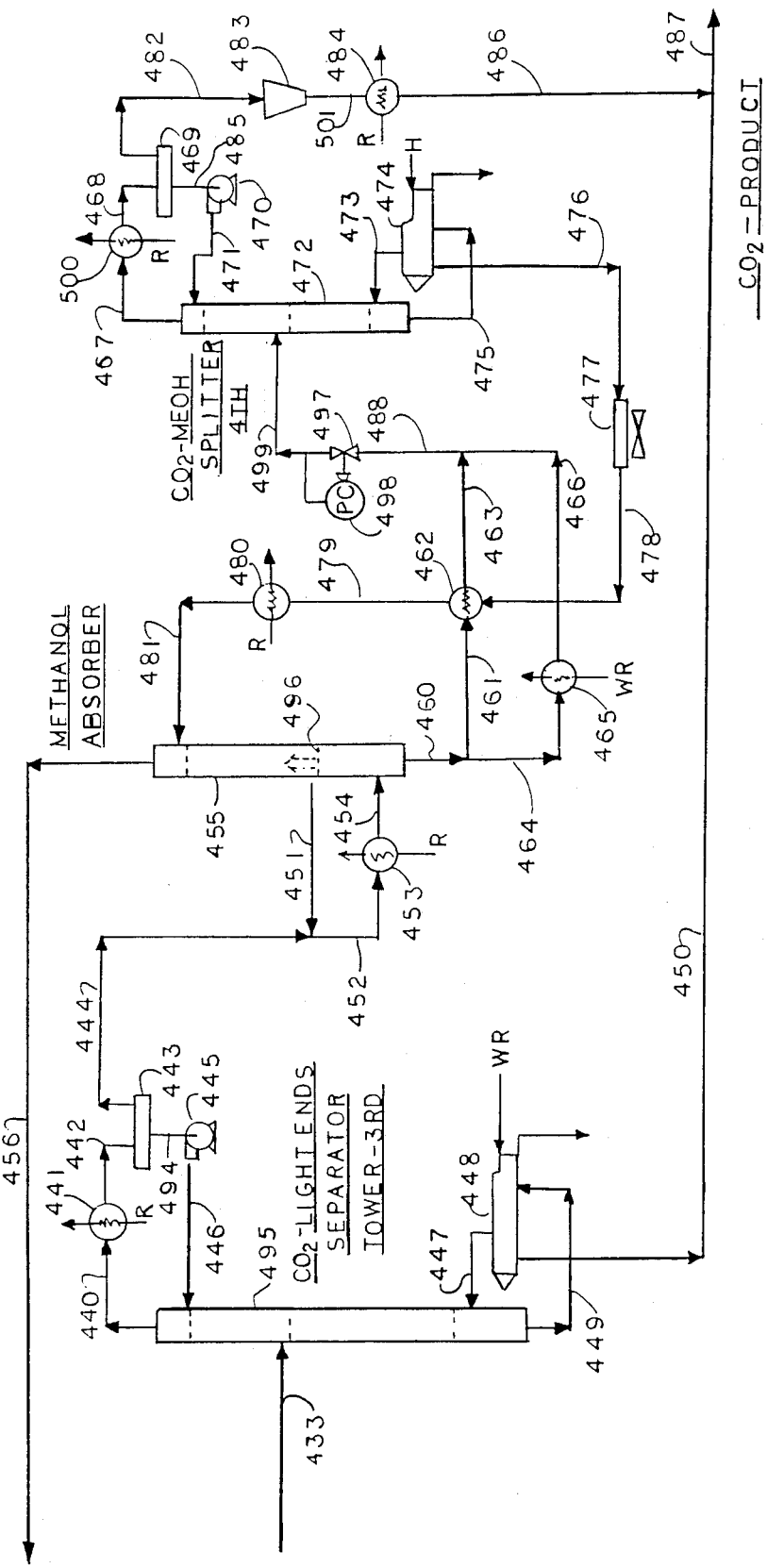

4,861,360

CARBON DIOXIDE ABSORPTION METHANOL PROCESS

CROSS REFERENCE TO RELATED APPLICATION

This application is a continuation-in-part of U.S. application Ser. No. 832,747, filed Feb. 24, 1984, by Fred Apffel, entitled "Carbon Dioxide Absorption Methanol Process," which is U.S. Pat. No. 4,675,035, issued June 23, 1987.

TECHNICAL FIELD

The invention relates generally to the removal of carbon dioxide from a mixed hydrocarbon stream. More specifically, it relates to the absorption of carbon dioxide with methanol for such removal.

BACKGROUND ART

Numerous secondary oil recovery projects use carbon dioxide as a miscible injectant to recover additional oil from existing oil reservoirs. Carbon dioxide has the ability to reduce the surface tension of oil adhering to shale or rocks, causing it to flow out of the oil well. As the oil is produced from the carbon dioxide injection, the related gas produced will increase in volume and carbon dioxide concentration. The total gas volume will increase by a factor of five to seven. The hydrocarbon gas volume will increase by a factor of two. The carbon dioxide concentration will increase from 5 to 90 percent by volume over the nine to ten year life of the project. The composition of the hydrocarbons will vary little.

This carbon dioxide must be removed before the hydrocarbons can be utilized as a product. The recovered carbon dioxide is reinjected into the wells. A number of process methods have been developed and are being tried for this purpose. They include the conventional amine absorption systems, seloxol absorption and many others. These conventional process schemes have proven to be very expensive and energy inefficient when compared to recently developed cryogenic distillative process methods such as the process taught by the U.S. Pat. No. 4,462,814, issued July 31, 1984, to Arthur S. Holmes and James M. Ryan, entitled "Distillative Separation of Gas Mixtures Containing Methane, carbon dioxide and Other Components", known in the industry as the Ryan/Holmes process. This process teaches a method of separating the hydrocarbons from the carbon dioxide and a method of preventing azeotrope formation of carbon dioxide and ethane during the distillation separation process.

The distillation process schemes utilized in attempting to separate methane from the carbon dioxide and other hydrocarbons must deal with the potential formation of carbon dioxide solids. Ryan/Holmes solves this problem by introducing an agent to prevent the formation of solid carbon dioxide. A second problem that distillation process methods must handle is the separation of ethane from carbon dioxide due to the formation of the carbon dioxide-ethane azeotrope. This azeotrope formation limits the degree to which the carbon dioxide may be separated from the ethane. The Ryan/Holmes process solves this problem by the further introduction of the aforementioned agent. This agent is a propane-and-heavier mixture of hydrocarbons or some other hydrocarbon miscible non-polar liquid. This agent serves to maintain the relative volatility of carbon dioxide to ethane above one, and the azeotrope is not formed.

For further illustrations of carbon dioxide removal, see U.S. Pat. No. 4,475,347, issued Oct. 9, 1984, to Hegarty et al., entitled "Process for Separating carbon dioxide and Sulphur-Containing Gases from a Synthetic Fuel Production Process Off-Gas"; U.S. Pat. No. 3,453,835, issued July 8, 1969, to Hochgesand, entitled "Absorption of carbon dioxide Employing Separately Cooled Absorbent Streams"; U.S. Pat. No. 3,977,203, issued Aug. 31, 1976, to Hinton et al., entitled "Purification of Natural Gas by Liquid/Liquid Extraction with a Polar Solvent"; U.S. Pat. No. 4,252,548, issued Feb. 24, 1981, to Breiter et al., entitled "carbon dioxide Removal from Methane-Containing Gases"; U.S. Pat. No. 4,293,322, issued Oct. 6, 1981, to Ryan et al., entitled "Distillative Separation of carbon dioxide from Hydrogen Sulfide": U.S. Pat. No. 4,318,723, issued Mar. 9, 1982, to Holmes et al., entitled "Cryogenic Distillative Separation of Acid Gases from Methane"; U.S. Pat. No. 4,350,511, issued Sept. 21, 1982, to Holmes et al., entitled "Distillative Separation of carbon dioxide from Light Hydrocarbons": U.S. Pat. No. 4,383,841, issued May 17, 1983, to Ryan et al., entitled "Distillative Separation of carbon dioxide from Hydrogen Sulfide"; U.S. Pat. No. 4,383,842, issued May 17, 1983, to 0'Brien, entitles "Distillative Separation of Methane and carbon dioxide"; U.S. Pat. No. 4,462,814, issued July 31, 1984, to Holmes et al., entitled "Distillative Separation of Gas Mixtures Containing Methane, carbon dioxide and Other Components"; U.S. Pat. No. 3,595,782, issued July 27, 1971, to Bucklin et al., entitled "Method for Separating carbon dioxide from Hydrocarbons"; U.S. Pat. NO. 3,640,052, issued Feb. 8, 1972, to Konoki et al., entitled "Process for Removing carbon dioxide in a Combined System for Producing Ammonia and Urea"; U.S. Pat. No. 3,683,634, issued Aug. 15, 1972, to Streich, entitled "Fractionation with Subsequent Recombination if Feed in Double Column Rectifier"; U.S. Pat. No. 3,899,212, issued Aug. 12, 1975, to Kruis et al., entitled "Extraction of Odorizing Sulfur Compounds from Natural Gas and Reodorization Therewith"; U.S. Pat. No. 3,983,711, issued Oct. 5, 1976, to Solomon, entitled "Plural Stage Distillation of a Natural Gas Stream"; U.S. Pat. No. 4,097,250, issued June 27, 1978, to Pagani et al., entitled "Method for the Purification of Natural Gas Having a High Contents of Acidic Acid"; U.S. Pat. No. 4,115,086, issued Sept. 19, 1978, to Jordan et al., entitled "Recovery of Light Hydrocarbons from Refinery Gas". U.S. Pat. No. 4,149,864, issued Apr. 16, 1979, to Eakman et al., entitled "Separation of carbon dioxide and Other Acid Gas Components from Hydrocarbon Feed"; U.S. Pat. No. 4,152,129, issued May 1, 1979, to Trentham et al., entitled "Method for Separating carbon dioxide from Methane"; U.S. Pat. No. 4,185,978, issued Jan. 29, 1980, to McGallard et al., entitled "Method for Cryogenic Separation of carbon dioxide from Hydrocarbons"; and U.S. Pat. No. 4,311,495, issued Jan. 19, 1982, to Stryino, entitled "Separating carbon dioxide and ethane by Liquid-Liquid Extraction."

DISCLOSURE OF THE INVENTION

The distillation and absorption process method disclosed avoids the potential formation of carbon dioxide solids by first separating a mixture of methane, lighter components, ethane and carbon dioxide from propane-and-heavier hydrocarbons in a first column. The degree of efficiency of separating the carbon dioxide and ethane between the top and bottom product is not critical. Consequently, carbon dioxide and ethane are found in both top and bottom products. The temperature and pressure required for this separation is such that no solid formation of carbon dioxide will take place.

In a first embodiment, thereafter, the overhead gas product is mixed with "lean" ethanol, obtained from the bottom of a chimney tray of a downstream Methanol Absorber, The carbon dioxide and ethane mixture is absorbed or dissolved into the methanol mixture during refrigeration. Absorption of the carbon dioxide and ethane is then accomplished in the Methanol Absorber. The heavy bottoms, propane-and-heavier, are separated in a second column, The remainder, carbon dioxide, ethane, and methanol mixture, is fed to another column, together with more lean methanol. The presence of the polar component methanol serves both to invert and to increase the relative volatility of carbon dioxide to ethane. This allows the ethane to be distilled or stripped from the carbon dioxide, ethane, methanol mixture in the third distillation column. The carbon dioxide is separated from the methanol in a fourth column. The methanol from this column becomes the "lean" methanol.

In an alternate embodiment, the heavy bottoms from the first tower containing some carbon dioxide and ethane are separated from the propane and heavier hydrocarbons in a second tower. The overhead carbon dioxide and ethane from this tower are recombined with the overhead gas from the first tower and compressed to a pressure of 600 to 650 psia. The compressed mixture is subsequently cross-exchanged with the first tower bottoms to provide reboiler heat and cool the compressed mixture. The mixture is further chilled with external refrigeration and fed to a third tower. The methane, ethane, lighter components and roughly 15 to 20 percent of the carbon dioxide are separated from the remaining carbon dioxide as an overhead gas. The remaining 80 to 85 percent carbon dioxide is separated as a bottoms liquid product.

Thereafter, the overhead gas product is mixed with "rich" methanol, obtained from the bottom of a downstream Methanol Absorber. The carbon dioxide and part of the ethane is absorbed or dissolved into the methanol mixture and refrigerated. Absorption of the remaining carbon dioxide gas is accomplished in the Methanol Absorber using "lean" methanol. The absorbed carbon dioxide is subsequently separated from the methanol in a fourth tower. The methanol from this tower becomes the "lean" methanol.

The separated carbon dioxide is compressed to a pressure of 600 to 650 psia and subsequently condensed and combined with the liquid carbon dioxide from the third tower as final carbon dioxide product.

BRIEF DESCRIPTION OF DRAWINGS

For a further understanding of the nature and objects of the present invention, reference is made to the following drawings in which like parts are given like numerals and wherein:

FIGS. IA and IB are a schematic flow diagram illustrating the distillative separation of carbon dioxide, methane and ethane from each other and from propane-and-heavier hydrocarbons, of the first embodiment of the present invention. Designations "R" and "H" illustrate the locations where propane or freon or other suitable refrigeration "R" and low-level gas compression or other heat "H" is provided by sources not shown; and FIGS. IC and ID are a schematic flow diagram illustrating the distillative separation of carbon dioxide, methane and ethane and from propane-and-heavier hydrocarbons, of the alternate embodiment of the present invention. Designations "R" and "H" illustrate the locations where propane or freon or other suitable refrigeration "R" and low-level gas compression or other heat "H" is provided by sources not shown. Designations "WR" illustrate the locations where warm propane or freon or other suitable refrigeration liquid is subcooled as it provides heat energy to the process fluid.

FIRST MODE FOR CARRYING OUT THE INVENTION

Figure 1A:
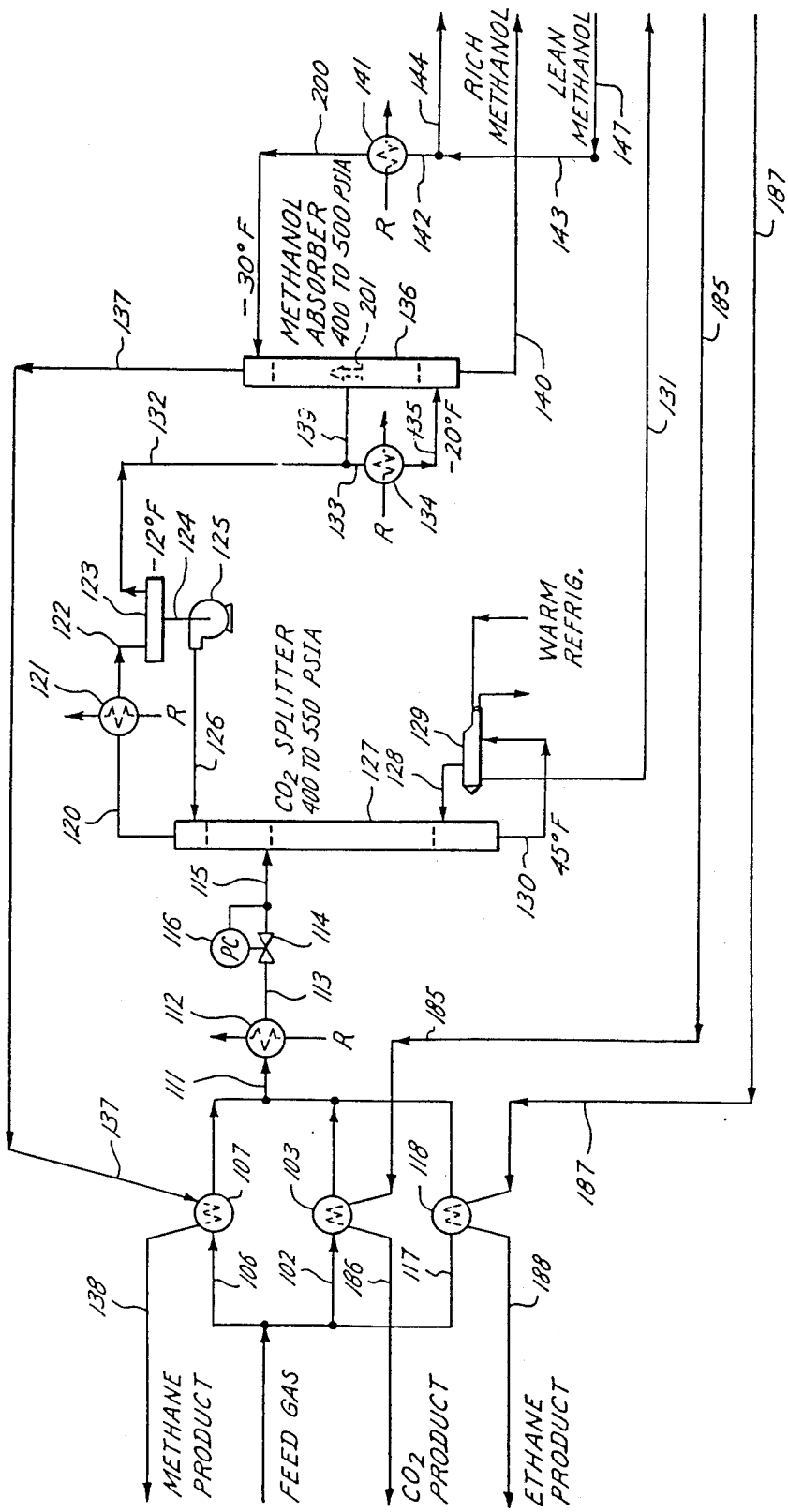
Figure 1B:
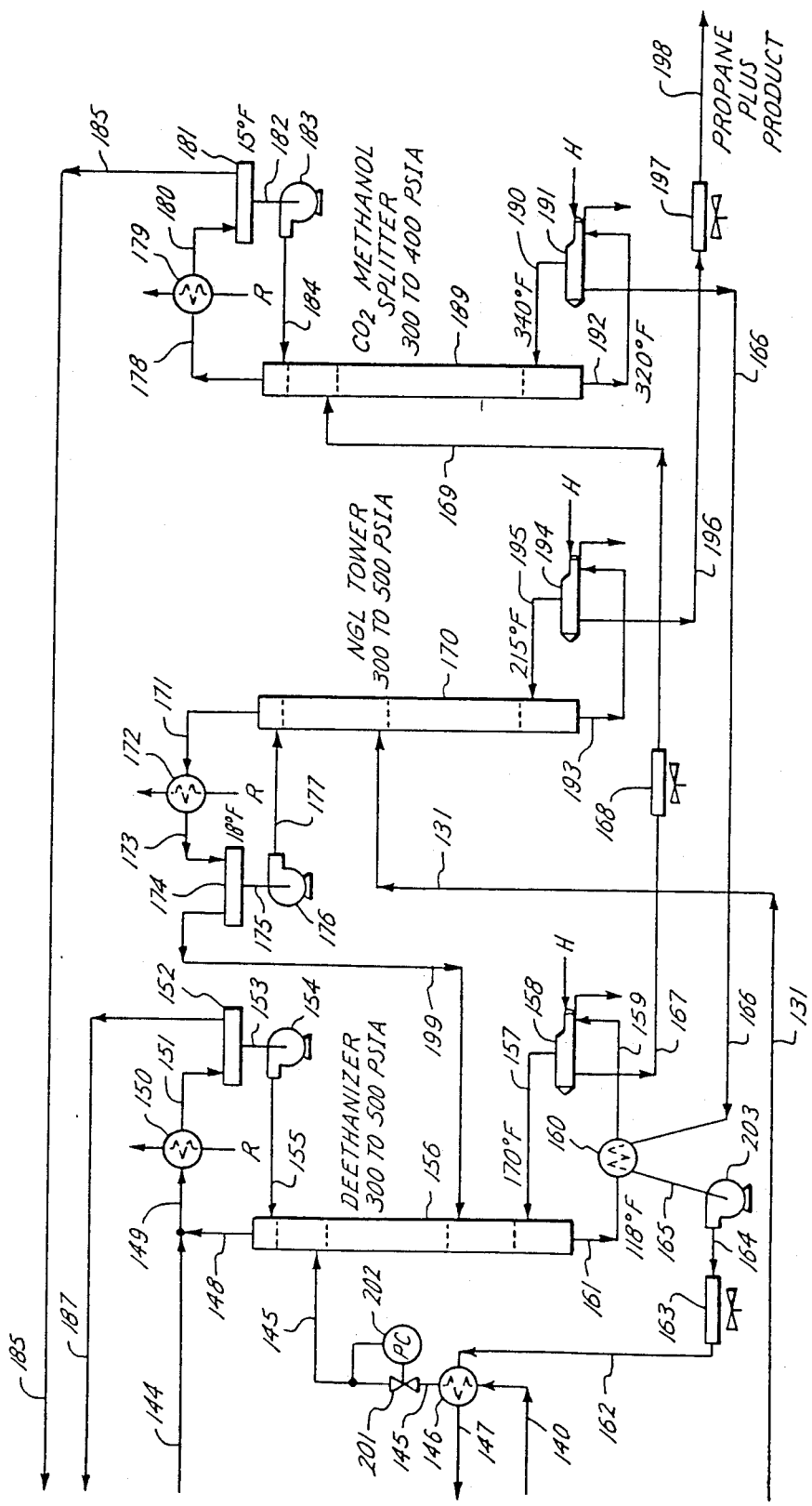

Referring to FIG. 1A, there is shown the feed gas stream 101 which is split into three streams 102, 106 and 117, The feed gas in streams 102, 106, 117 cross-exchange with product methane in stream 137, for stream 106, product ethane in stream 187, for stream 117, and product carbon dioxide in stream 185 for stream 102, The split is distributed on the basis of the cryogenic energy that can be recovered from each of these outgoing streams 137, 187, 185. The exchange of energy is accomplished in Feed Gas to Methane Gas Exchanger 118 for streams 117, 187, Feed Gas to Ethane Gas Exchanger 107 for streams 106, 137, and Feed Gas to Carbon Dioxide Exchanger 103 for streams 102, 185. The cooled feed gas from streams 102, 106, 117 is recombined in stream 111 and chilled to a temperature of 50° to −30° F. with propane or freon or other suitable refrigeration (not shown in detail) in a Chiller 112. The chilled feed stream 113 is reduced in pressure to a level of 550 to 400 psia by a pressure control valve 114 and fed to a $CO_2$ Splitter 127 via valve effluent stream 115. The pressure is set and controlled by a Pressure Controller 116. The overhead gas from the $CO_2$ Splitter 127 exits in stream 120 and is chilled to a temperature of 0° to −30° F. by a $CO_2$ Splitter Reflux Condenser 121 with propane or freon refrigeration (not shown in detail). The effluent stream 122 from the Splitter Reflux Condensor 121 flows to a Reflux Accumulator 123. Part of the gas in stream 122 is condensed, and this liquid is separated from the gas in the Reflux Accumulator 123, the liquid leaving the Reflux Accumulator 123 via stream 124. The liquid in stream 124 is pumped by a Reflux Pump 125 to the $CO_2$ Splitter 127 via stream 126. The uncondensed carbon dioxide ethane, and methane-and-lighter gases exit the Reflux Accumulator 123 via stream 132.

The bottom stream 130 from $CO_2$ Splitter 127 is heated using heat from the refrigerant fluid (not shown in detail) in a $CO_2$/Splitter Reboiler 129. The purpose is to recover the colder refrigerant energy from the process fluid in stream 130 which is at a temperature of 25° to 65° F. The refrigerant fluid is cross-exchanged in the $CO_2$/Splitter Reboiler 129 with the process stream 130 from the $CO_2$ Splitter 127. The heat partially vaporizes this fluid. The vapor is returned to the $CO_2$ Splitter 127 via stream 128. The liquid, free of methane-and-lighter components and containing some carbon dioxide. ethane and all of the propane-and-heavier hydrocarbons, exits the $CO_2$/Splitter Reboiler 129 in stream 131 which is fed to an NGL Tower 170.

Stream 132 is combined with liquid in stream 139 which is from a chimney tray 201 of a Methane Absorber 136 to form stream 133 which feeds to the Absorber Feed Chiller 134. Stream 133 is chilled in the Absorber Feed Chiller 134 to temperatures of 10° to −35° F. Part of the carbon dioxide and ethane are condensed and dissolved in the methanol and exits the Absorber Feed Chiller 134 in stream 135. Stream 135 is fed to the bottom of the Methanol Absorber 136. The vapor and liquid are separated in the bottom of the Methanol Absorber 136. The uncondensed methane carbon dioxide and ethane gas flow up the absorber countercurrent to the downcoming "lean" methanol, which absorbs the carbon dioxide. ethane and not the methane. In this context, "lean" methanol means methanol that has been essentially stripped free of ethane. carbon dioxide and other hydrocarbons. The "lean" methanol feeds the top of the Methanol Absorber 136 in stream 200 at temperatures of −35° to 10° F. The methanol rate is adjusted on the basis of absorbing the carbon dioxide and rejecting the methane-and-lighter components. This is approximately between two and three to one molal ratio of methanol to carbon dioxide. The Methanol Absorber 136 is operated at pressures of 400 to 500 psia. The methane-and-lighter lighter component such as nitrogen exit the top of the Methanol Absorber 136 in stream 137 at temperatures of −10° to 25° F. above the temperature of the "lean" methanol in stream 200. Stream 137 cross-exchanges with the feed gas in Exchanger 107 and exits to the pipeline in stream 138 at temperatures of 80° to 110° F.

The "rich" methanol, which is the methanol containing the absorbed carbon dioxide, ethane and other heavier hydrocarbons, leaves the bottom of the Methanol Absorber 136 in stream 140 at temperatures of 10° to −40° F. This "rich" methanol stream 140 is cross-exchanged in a Lean-Rich Methanol Cross-Exchanger 146 with the "lean" methanol from stream 162 to heat the "rich" methanol to a temperature of 80° F which exits in stream 147 and correspondingly reduces the "lean" methanol to a temperature level of −10° to 20° F., recovering the cryogenic refrigerant energy. The "rich" methanol in stream 145 is reduced in pressure to 300 to 375 psia by a pressure control valve 201, which is controlled by a Pressure Controller 202. The "rich" methanol stream 145 subsequently feeds a Deethanizer 156. This feed stream 145 is fed near the top of the Deethanizer 145 on the top third or fourth tray.

Stream 131 is fed to the NGL Tower 170 to separate the carbon dioxide and ethane from the propane-and-heavier hydrocarbons. The overhead gas from NLG Tower 170 in stream 171 is fed to an NGL Tower Reflux Condenser 172 where the stream is refrigerated with propane or freon (not shown in detail), to temperatures of 0° to 50° F. The partially condensed fluid from the Reflux Condenser 172 is fed to an NGL Reflux Accumulator 174 via stream 173. The vapor is separated from the liquid in NGL Reflux Accumulator 174. The liquid reflux flows from the Reflux Accumulator 174 via stream 175 to an NGL Reflux Pump 176 and subsequently pumped to the NGL Tower 170 via stream 177.

The vapor from the Reflux Accumulator 174 exits in stream 199 to the Deethanizer 156. This vapor acts as a stipping medium and is fed near the lower part of the Deethanizer 156.

The liquid bottoms exit the NGL Tower in stream 193 and flows to an NGL Tower Reboiler 194. Heat is provided to the NGL Tower Reboiler 194 using steam (not shown in detail) or some other suitable heat medium. The liquid in stream 193 is heated in the NGL Tower Reboiler 194 to a temperature of 200° to 250° F. where part of the liquid is vaporized. The vapor returns to the NGL Tower via stream 195. The unvaporized liquid exits in stream 196 and is subsequently cooled by the Air Cooler 197 to a temperature of 120° F. or less. The cooled liquid from the Air Cooler 197 exits the system as the propane-and-heavier product via stream 198.

Those skilled in the art, will recognize that there are other suitable means of cooling stream 197, such as a water cooled heat exchanger, as well as many ways and alternate refrigerants to use for cooling and heating the other process streams.

The Deethanizer 156 separates the ethane from the carbon dioxide and the methanol. The overhead from Deethanizer 156 exits in stream 148 and is combined with a split stream 144 of the recycled "lean" methanol from stream 147 to form stream 149. The purpose of this combination is to preferentially reabsorb any carbon dioxide that may be displaced to the top of the Deethanizer 156 during the distillation. The mixture in stream 149 is chilled to temperatures of 0° to 30° F. in a Deethanizer Reflux Condenser 150 using the propane or freon refrigeration (not shown in detail). The mixture exits the Deethanizer Reflux Condenser 150 and flows to a Reflux Accumulator 152 via stream 151. The liquid is separated from the vapor in the Reflux Accumulator 152 and then flows to a Reflux Pump 154 via stream 153, and is pumped to the Deethanizer 156 via stream 155, Ethane exits the Reflux Accumulator 152 as a gas in stream 187 at temperatures of 0° to 35° F., to cross-exchange with the incoming feed gas 117 in exchanger 118. The ethane exits the plant in stream 188 at temperatures 80° to 110° F..

The Deethanizer Tower 156 bottoms feed a Deethanizer Tower Reboiler 158 via stream 161 at 90° to 120° F. The bottoms in stream 161 are heated to a temperature of 130° to 190° F. by a cross-exchange with hot "lean" methanol from a $CO_2$/Methanol Splitter 189 flowing in stream 166. This heat or energy exchange is made by a Deethanizer Bottoms/Methanol Exchanger 160. The purpose is to recover heat energy and cool the "lean" methanol.

The Deethanizer 156 bottoms exit the Deethanizer Bottoms/Methanol Exchanger 160 in stream 159 to a final or Deethanizer Trim Reboiler 158 where the Deethanizer 156 bottoms fluid is further heated to temperatures of 150° to 210° F. using steam (not shown in detail) or some other suitable heat source. The vapor generated by the Trim Reboiler is returned to the Deethanizer 156 via stream 157. The liquid carbon dioxide and methanol exit the Deethanizer Trim Reboiler 158 in stream 167 where it is cooled to 120° F. or less by the Air Cooler 168. The cooled liquids exits the Air Cooler 168 via stream 169. As set out above, other kinds of media or exhanges, such as in this case a water cooled exchanger could be used without departing from the invention.

The cooled liquid in stream 169 is fed to the $CO_2$/Methanol Splitter 189. The carbon dioxide is separated from the methanol in the $CO_2$/Methanol Splitter 189. The overhead gas exits from the $CO_2$/Methanol Splitter in stream 178 and is chilled by the freon or propane refrigerant (not shown in detail) in a $CO_2$/Methanol Splitter Condenser 179 to a temperature of 0° to 40° F. The chilled stream exits the $CO_2$/Methanol Splitter Condensor 179 via stream 180 and flows to the $CO_2$/Methanol Reflux Accumulator 181. The vapor and liquid are separated in CO$_2$/Methanol Reflux Accumulator 181. The carbon dioxide vapor or gas exits the accumulator via stream 185 to flow to Feed Gas to Carbon Dioxide Exchanger 103. The carbon dioxide in stream 185 is heated to 80° to 100° F. by a cross-exchange of energy with the feed gas 102. The heated carbon dioxide exits the plant in stream 186.

The liquid reflux flows from the Reflux Accumulator 181 to a CO$_2$/Methanol Reflux Pump 183 via stream 182 and is pumped to the CO$_2$/Methanol Splitter 189 via stream 184.

The CO$_2$/Methanol Splitter 189 bottoms stream 192 is heated from 300° to 350° F. to a temperature of 320° to 380° F. by a CO$_2$/Methanol Splitter Reboiler 191. Steam or some other suitable means of heat is required for the CO$_2$/Methanol Splitter Reboiler 191. Part of the fluid is vaporized and returned to the CO$_2$/Methanol Splitter 189 via stream 190. The hot "lean" methanol liquid exits the CO$_2$/Methanol Splitter Reboiler 191 in stream 166. This hot "lean" methanol in stream 166 is cross-exchanged in the Deethanizer Bottoms/Methanol Exchanger 160 to cool the "lean" methanol and reduce the heat energy load. The cooled "lean" methanol exits the Deethanizer Bottoms/Methanol Exchanger 160 via stream 165 to the Lean Methanol Pump 203, where the pressure is elevated to a level of 500 to 650 psia in stream 164. The "lean" methanol is further cooled to 120° F. by the Air Cooler 163 and subsequently cross-exchanged with the "rich" methanol to recover the refrigerated energy in the Lean-Rich Methanol Exchanger 146.

The cooled "lean" methanol exits the Lean-Rich Methanol Exchanger 146 via stream 147. The "lean" methanol in stream 147 is split into two streams. One stream 142 is further refrigerated to a temperature level of 0° to −35° F. by a Methanol Chiller 141 using an external refrigeration source such as freon or propane (not shown in detail). The chilled "lean" methanol flows from the Mmethanol Chiller 141 via stream 200 to the top of the Methanol Absorber 136. The other stream 144 from stream 147 is combined with the overhead gas in stream 148 and flows to the Deethanizer Reflux Condenser 152. This completes the recycle of the methanol system.

In operation, the methane, lighter components, together with most of the carbon dioxide and some ethane, are separated from the propane-and-heavier hydrocarbons in CO$_2$ Splitter 127. Approximately fifteen to twenty percent of the incoming carbon dioxide and twenty five to thirty five percent of the incoming ethane is distributed to the bottoms product. The efficiency of the separation with respect to carbon dioxide and ethane distribution between the top and bottom products is not critical. An effective separation of the propane-and-heavier hydrocarbons from the methane-and-lighter components is important. The heavier hydrocarbons are difficult to separate from methanol. In fact, the pentane-and-heavier hydrocarbons would form an azeotrope with methanol, Fortunately this separation is very easy to achieve. Due to this method of separation, the operating temperatures and pressure of −40° to 0° F. and 400 to 550 psia in the CO$_2$ Splitter 127 are such that solidification of carbon dioxide will not occur.

The overhead gas product from this distillation containing methane, lighter components, carbon dioxide, and ethane is mixed with liquid withdrawn at the bottom chimney tray of Methanol Absorber 136. The mixture is refrigerated to a temperature of −40° to 0° F. This partially condenses some of the carbon dioxide and ethane both of which are absorbed or dissolved into the "lean" methanol. The refrigeration removes the heat of solution or absorption and effectively reduces the "lean" methanol rate. The mixture is fed to the bottom of the Methanol Absorber 136 where the gas and liquid separate. The gas flows upward, countercurrent to the downcoming "lean" methanol fed at the top of the Methanol Absorber 136. This "lean" methanol has been chilled to a temperature of 0° to −40° F. The "lean" methanol rate is based on a molal ratio of carbon dioxide to methanol of between two and three to one. The carbon dioxide and ethane both are more soluble in methanol than methane or the lighter components. Consequently, these components are dissolved or absorbed in the "lean" methanol. The separated liquid leaves the bottom of the Methanol Absorber 136 as a liquid at temperatures of 10° to 20° degrees above the inlet "lean" methanol. Hydrogen Sulfide is also very soluble in methanol and if any is present, it will be dissolved in the methanol. The "rich" methanol is cross-exchanged with the "lean" methanol to recover the cryogenic energy and warm the "rich" methanol.

The bottoms from the CO$_2$ Splitter 127 is fed to the NGL Tower 170. The ethane and carbon dioxide are distilled in the NGL Tower 170 as a top gas product at temperature of 0° to 30° F. If hydrogen sulfide is present it will become a part of the ethane and carbon dioxide product. The NGL Tower 170 is operated at pressures of 300 to 500 psia. The bottom from the NGL Tower 170 is cooled to 120° F. to exit the system as a propane-and-heavier hydrocarbon product liquid.

The warmed bottoms "rich" methanol from the Methanol Absorber 136 are fed on the top third or fourth tray of the Deethanizer 156. The overhead gas product from the NGL Tower 170 is fed at the bottom of the Deethanizer 156. A small amount, approximately ten to twenty percent of the total "lean" methanol, is fed at the top of the Deethanizer 156 in stream 144. As discussed above, the presence of the methanol, a polar molecular. serves to invert the relative volatility ratio of carbon dioxide and ethane causing the ethane to become the lighter component. On this basis, the ethane is distilled or stripped from the carbon dioxide and methanol as the top product. This presence of the methanol also serves to increase the relative volatility ratio of ethane to carbon dioxide, making the separation of ethane from the carbon dioxide methanol mixture much less difficult. This ethane may be recombined with the methane product or maintained separately. The Deethanizer 156 is operated at pressures of 300 to 500 psia with top temperatures of 10° to 35° F. and corresponding bottom temperatures 100° to 200° F.

The bottoms from the Deethanizer 156, carbon dioxide and methanol, are fed to the CO$_2$/Methanol Splitter 189, The carbon dioxide is distilled as the overhead product and may be recovered as a liquid or vapor. If hydrogen sulfide is present, it will become a art of the carbon dioxide product. The methanol bottoms product stripped of carbon dioxide and other hydrocarbons becomes the "lean" methanol. It is cooled to 120° F. and recycled to the system. The CO$_2$/Methanol Splitter is operated at pressures of 300 to 400 psia with top temperatures of −15° to 25° F. and corresponding bottoms temperatures 300° to 400° F.

Typical operating conditions, product distributions and flow rates are illustrated in Table I.

TABLE I

| COMPONENT | STREAM 101 | STREAM 132 | STREAM 131 | STREAM 137 | STREAM 138 | STREAM 142 |
|---|---|---|---|---|---|---|
| N2 | 98.00 | 97.92 | 0.08 | 97.92 | 97.92 | 0.00 |
| CH4 | 514.00 | 513.80 | 0.20 | 513.00 | 513.00 | 0.00 |
| CO2 | 1000.00 | 815.96 | 184.04 | 10.77 | 10.77 | 28.58 |
| H2S | 3.60 | 1.69 | 1.91 | 0.00 | 0.00 | 0.00 |
| C2H6 | 158.00 | 111.98 | 46.02 | 51.84 | 51.84 | 0.00 |
| C3H8 | 132.00 | 12.62 | 119.38 | 0.00 | 0.00 | 0.00 |
| IC4H1O | 62.00 | 0.01 | 61.99 | 0.00 | 0.00 | 0.00 |
| IC5H12 | 26.00 | 0.00 | 26.00 | 0.00 | 0.00 | 0.00 |
| NC6H14 | 6.40 | 0.00 | 6.40 | 0.00 | 0.00 | 0.00 |
| MEOH | 0.00 | 0.00 | 0.00 | 0.09 | 0.09 | 2000.00 |
| TOTAL | 2000.00 | 1553.98 | 446.02 | 673.62 | 673.62 | 1825.00 |
| TEMP-F | 115 | −12 | 68 | −29 | 100 | 77 |
| PRES-PSIA | 615 | 500 | 503 | 500 | 495 | 545 |

| COMPONENT | STREAM 140 | STREAM 199 | STREAM 196 | STREAM 144 | STREAM 187 | STREAM 169 | STREAM 185 |
|---|---|---|---|---|---|---|---|
| N2 | 0.00 | 0.08 | 0.00 | 0.00 | 0.00 | 0.00 | 0.00 |
| CH4 | 0.80 | 0.20 | 0.00 | 0.00 | 1.00 | 0.00 | 0.00 |
| CO2 | 833.77 | 183.46 | 0.58 | 6.00 | 13.04 | 1010.19 | 975.61 |
| H2S | 1.69 | 1.56 | 0.35 | 0.00 | 0.04 | 3.21 | 3.21 |
| C2H6 | 60.14 | 40.04 | 5.98 | 0.00 | 80.24 | 19.94 | 19.94 |
| C3H8 | 12.62 | 2.78 | 116.60 | 0.00 | 0.00 | 15.40 | 15.40 |
| IC4H1O | 0.02 | 0.03 | 61.96 | 0.00 | 0.00 | 0.05 | 0.05 |
| IC5H12 | 0.00 | 0.00 | 26.00 | 0.00 | 0.00 | 0.00 | 0.00 |
| NC6H14 | 0.00 | 0.00 | 6.40 | 0.00 | 0.00 | 0.00 | 0.00 |
| MEOH | 1999.91 | 0.00 | 0.00 | 400.00 | 0.19 | 2399.72 | 0.96 |
| TOTAL | 2908.95 | 228.15 | 217.87 | 406.00 | 94.51 | 3448.51 | 1015.17 |
| TEMP-F | 7 | 19 | 215 | 77 | 25 | 115 | 15 |
| PRES-PSIA | 505 | 450 | 455 | 545 | 360 | 355 | 350 |

| COMPONENT | STREAM 62 |
|---|---|
| N2 | 0.00 |
| CH4 | 0.00 |
| CO2 | 34.58 |
| H2S | 0.00 |
| C2H6 | 0.00 |
| C3H8 | 0.00 |
| IC4H1O | 0.00 |
| IC5H12 | 0.00 |
| NC6H14 | 0.00 |
| MEOH | 2398.76* |
| | 2433.34 |
| TEMP-F | 120 |
| PRES-PSIA | 555 |

*METHANOL MAKE UP IS 1.24 MOL/HR

The overall utility requirements are illustrated in Table II.

TABLE II

| UTILITIES | | |
|---|---|---|
| HORSEPOWER | APFFEL METHANOL BHP | RYAN/HOLMES BHP |
| Pumps | 51 | 124 |
| Air Coolers | 206 | 250 |
| Compressors | 4,226 | 5,570 |
| Total | 4,483 | 5,944 |
| | DUTY MBTU/HR | DUTY MBTU/HR |
| Steam | 31,027 | 32,235 |

ALTERNATE EMBODIMENT MODE FOR CARRYING OUT THE INVENTION

Figure 1C:
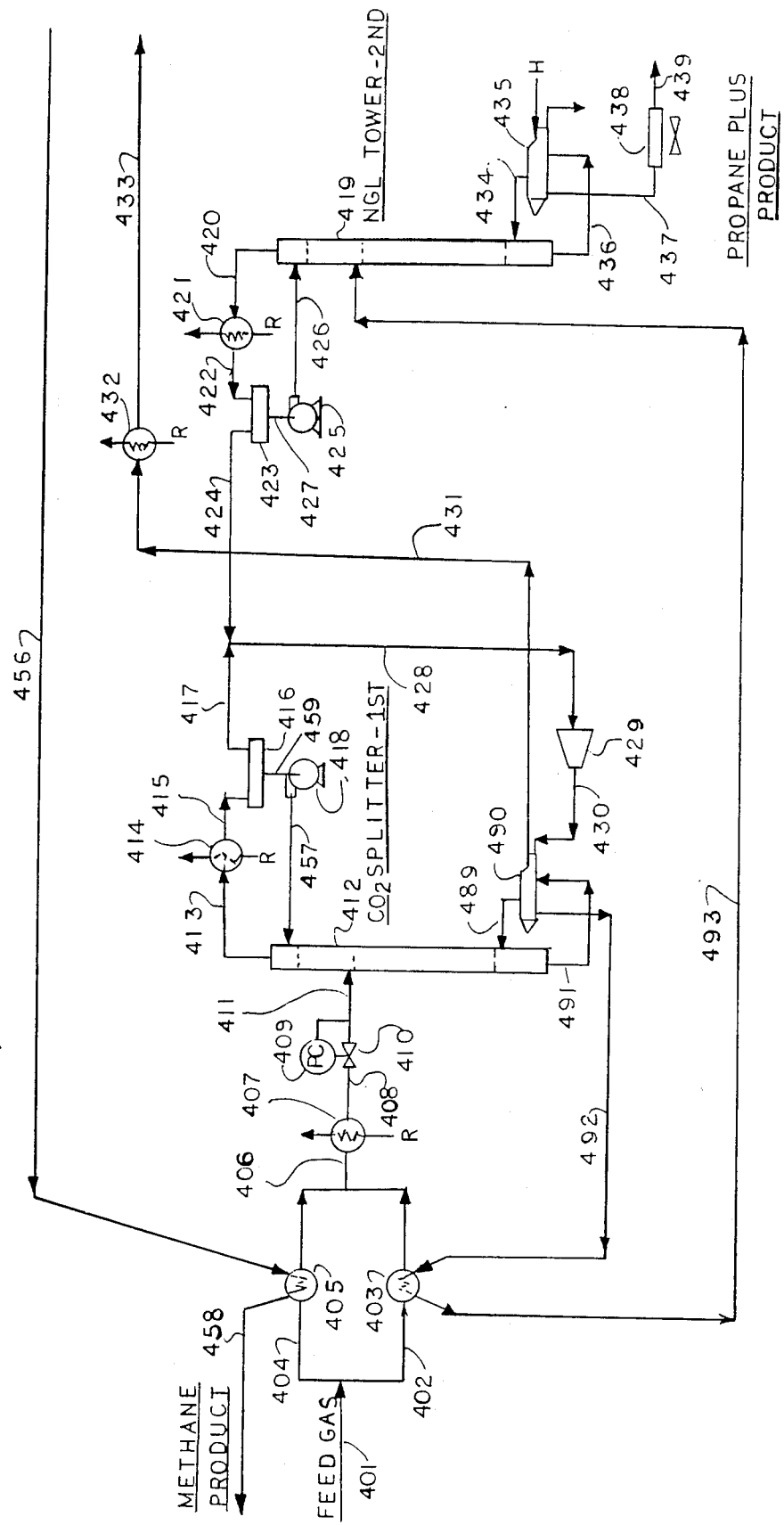

Referring to FIG. 1C, there is shown the feed gas stream 401 feeding to a CO2-Splitter 412. Stream 401 is split into two streams 402 and 404. The feed gas in streams 402 and 404 cross-exchange with product methane in stream 456 for stream 404 and CO2-Splitter bottoms stream 492 for stream 402. The split is distributed on the basis of the cryogenic energy that can be recovered from each of these outgoing streams 456 and 492. The exchange of energy is accomplished in a Feed Gas to Methane Gas Exchanger 405 for streams 404 and 456. The exchange of energy is accomplished in a Feed Gas to CO2-Splitter bottoms exchanger 403 for streams 402 and 492. The cooled feed gas streams 402 and 404 are recombined in a stream 406 and chilled to a temperature of 50° to −30° F. with propane or freon or other suitable refrigeration (not shown in detail) in a Chiller 407 fed by stream 406. The effluent chilled feed stream 408 from Chiller 407 is reduced in pressure to a level of 350 to 400 psia by a pressure control valve 410 at the outlet of stream 408. The effluent stream 411 from valve 410 is fed to a CO2-Splitter 412. The pressure in stream 411 is set and controlled by a Pressure Controller 409 which operates valve 410, CO2-Splitter 412 separates the components of stream 411. The overhead gas from the CO2 Splitter 412 exits in a stream 413 and is chilled to a temperature of 0° to −30° F. by a CO2 Splitter Reflux Condensor 414 with propane or freon refrigeration or other suitable refrigerant (not shown in detail). The effluent stream 415 from the CO2-Splitter Reflux Condensor 414 flows to a Reflux Accumulator 416. Part of the gas in stream 415 is condensed in Accumulator 416, and this liquid is separated from the gas in the Reflux Accumulator 416, the liquid leaving the Reflux Accumulator 416 via a stream 459. The liquid in stream 459 is pumped by a Reflux Pump 418 to the $CO_2$-Splitter 412 via a stream 457. The uncondensed carbon dioxide, ethane, and methane-and-lighter gases of stream 415 exit the Reflux Accumulator 416 via stream 417.

The bottom stream 491 from $CO_2$-Splitter 412 is heated using heat from the compressed mixture of gas in a stream 430, in a $CO_2$-Splitter Reboiler 490. The purpose of Reboiler 490 is to chill the compressed gas mixture in stream 430 and recover the refrigerant energy from the process stream 491 which is at a temperature of 10° to 25° F. Accordingly the compressed mixture of gas in stream 430 is cross-exchanged in the $CO_2$-Splitter Reboiler 490 with the process stream 491 from the $CO_2$-Splitter 412. The heat partially vaporizes the fluid in stream 491. The vapor is returned to the $CO_2$-Splitter 412 via a stream 489. The resulting liquid from exchanger 490, free of methane-and-lighter components present in stream 491 and containing some carbon dioxide, ethane, most of the propane and all of the butane and heavier hydrocarbons, exits the $CO_2$-Splitter Reboiler 490 via a stream 492. The fluid in stream 492 is cross-exchanged in exchanger 403 with the incoming feed gas in stream 402. The purpose of this exchange is to heat the process stream 492 prior to feeding it to an NGL Tower 419 via a stream 493 which exits exchanger 403 as discussed above, and to recover the refrigerant energy of stream 492 by chilling the feed stream 402. The cross-exchange of energy occurs as the streams 402 and 492 flow through Exchanger 403.

Stream 493 is fed to the NGL Tower 419, which Tower 419 separates the carbon dioxide and ethane from the propane-and-heavier hydrocarbons in stream 493. The overhead gas from the NGL Tower 419 is fed via stream 420 to an NGL Tower Reflux Condenser 421 where the stream 420 is refrigerated with propane or freon or other suitable refrigerant (not shown in detail), to temperatures of 0° to 20° F. The partially condensed fluid from the Reflux Condenser 421 is fed to an NGL Reflux Accumulator 423 via an exit stream 422 from condenser 421. The liquid reflux flows from the Reflux Accumulator 423 via a stream 427 to an NGL Reflux Pump 425 and subsequently is pumped to the NGL Tower 419 via a stream 426.

The vapor from the Reflux Accumulator 423 exits in a stream 424 and is combined with the vapor in stream 417 to form the feed stream 428 to the inlet of a Compressor 429. The vapor from stream 428 is compressed to a pressure of 600 to 650 psia and subsequently flows via outlet stream 430 from Compressor 429 to the $CO_2$-Splitter Reboiler 490 to provide heat to the Reboiler 490 and to recover the cryogenic energy in stream 430, lowering the vapor temperature from 50° F. to 25° F. The chilled vapor exits reboiler 490 in stream 431 and is further refrigerated by the Chiller 432 with propane or freon or other suitable refrigerant (not shown in detail) to temperatures of −10° F. to 20° F. and fed to a $CO_2$/Light Ends Separator Tower 495 via outlet stream 433 from chiller 432.

The liquid bottoms exit the NGL Tower 419 in a stream 436 and flow to an NGL Tower Reboiler 435. Heat is provided to the NGL Tower Reboiler 435 by steam or other suitable media (not shown in detail) or some other suitable heat medium. The liquid in stream 436 is heated in the NGL Tower Reboiler 435 to a temperature of 150° to 220° F. where part of the liquid is vaporized. The vapor is returned to the NGL Tower 419 via a stream 434. The unvaporized liquid exits in stream 437 and is subsequently cooled by an Air Cooler 438 to a temperature of 120° F. or less. The cooled liquid from the Air Cooler 438 exits the system as the propane-and-heavier product via stream 439.

Stream 433 is fed to the $CO_2$/Light Ends Separator Tower 495 to separate the ethane, lighter components and part of the carbon dioxide vapor (15 to 20 volume percent) from the major part or remaining carbon dioxide bottoms (80 to 85 volume percent).

The liquid bottoms exit the $CO_2$/Light Ends Separator Tower 495 in stream 449 to a Reboiler 448. Heat is provided to the Reboiler 448 by subcooling refrigerant such as propane or freon or other suitable refrigerant (not shown in detail) or some other suitable refrigerant. The liquid in stream 449 is heated to a temperature of 30° to 50° F. where part of the liquid is vaporized. The vapor returns to the $CO_2$/Light Ends Separator Tower 495 via a stream 447. The unvaporized liquid exits Reboiler 448 in stream 450 as part of the carbon dioxide liquid product.

The overhead gas from the $CO_2$/Light Ends Separator Tower 495 in stream 440 is fed to a Reflux Condenser 441 where the stream is refrigerated with propane or freon or other suitable refrigerant (not shown in detail), to a temperature of −10° to 20° F. The partially condensed fluid from the Reflux Condenser 441 is fed to a Reflux Accumulator 443 via a stream 442. The vapor is separated from the liquid in the Reflux Accumulator 443. The liquid reflux flows from the Reflux Accumulator 443 via a stream 494 to a Reflux Pump 445 and subsequently is pumped to the $CO_2$/Light Ends Separator Tower 495 via a stream 446. The vapor from the Reflux Accumulator 443 exits in a stream 444.

Stream 444 is combined with liquid from a side stream 451 which is taken from, for example, chimney tray 496 of a Methanol Absorber 455. The combined streams form a stream 452 which feeds an Absorber Feed Chiller 453. Stream 452 is chilled in the Absorber Feed Chiller 453 to temperatures of 10° to −35° F. by propane or freon or other suitable refrigerant (not shown in detail). The carbon dioxide and a small part of the ethane are condensed and dissolved in the methanol and the contents of stream 452 exits the Absorber Feed Chiller 453 in a feed stream 454. Stream 454 is fed to the bottom of the Methanol Absorber 496. The vapor and liquid are separated in the bottom of the Methanol Absorber 496. The uncondensed methane, carbon dioxide and ethane gas flow up the absorber countercurrent to the downcoming "lean" methanol flowing down in Methanol Absorber 496. The "lean" methanol means methanol that has been essentially stripped free of ethane, carbon dioxide and other hydrocarbons. The "lean" methanol feeds the top of the Methanol Absorber 496 from a stream 481 at temperatures of −35° to 10° F. The methanol rate is adjusted on the basis of absorbing the carbon dioxide and rejecting the ethane-methane-and-lighter components. This is approximately between two and three to one molal ratio of methanol to carbon dioxide. The Methanol Absorber 496 is operated at pressures of 500 to 650 psia. The ethane-methane-and-lighter component such as nitrogen exit the top of the Methanol Absorber 496 in a stream 456 at temperatures of 3° to 5° F. above the temperature of the "lean" methanol in stream 481. Stream 456 cross-exchanges with a feed gas in Exchanger 405 and exits to the pipeline (not shown) in a stream 458 from Exchanger 485 at temperatures of 80° to 110° F.

The "rich" methanol, which is the methanol containing the absorbed carbon dioxide, ethane and other hydrocarbons, leaves the bottom of the Methanol Absorber 496 in a stream 460. This stream is split into two streams, 461 and 464. The "rich" methanol stream 461 is cross-exchanged in a Lean-Rich Methanol Exchanger 462 with the "lean" methanol from a stream 478 to heat the "rich" methanol in stream 461 to a temperature of 80° to 110° F. which exits in a stream 463 and correspondingly reduces the "lean" methanol in stream 478 to a temperature level of $-10°$ to 20° F. which exits in a stream 479, recovering the cryogenic refrigerant energy in stream 461. The other "rich" methanol stream 464 is cross-exchanged in a Rich Methanol-Refrigerant Exchanger 465 to subcool the propane, freon or other suitable refrigerant (not shown in detail), for use elsewhere as discussed above and correspondingly heat the "rich" methanol in stream 465 to a temperature of 80° to 110° F. which exits Exchanger 465 in a stream 466. Streams 463 and 466 are recombined in a stream 488. The "rich" methanol is stream 488 is reduced in pressure to 300 to 500 psia by a Pressure Control Valve 497 located at the exit of stream 488. The pressure is set and controlled by a Pressure Controller 498 which manipulates Valve 497. The "rich" methanol exits Valve 497 in a stream 499 which feeds a $CO_2$-Splitter 472.

Stream 499 is fed to the $CO_2$/Methanol Splitter 472. The carbon dioxide in stream 499 is separated from the methanol in stream 499 in the $CO_2$/Methanol Splitter 472 with the carbon dioxide exiting as a vapor or gas and the methanol exiting as a liquid. The overhead gas exits from the $CO_2$/Methanol Splitter 472 in a stream 467 and is chilled by the freon or propane or other suitable refrigerant (not shown in detail) to a temperature of 0° to 40° F. The chilled stream exits the $CO_2$/Methanol Splitter Condensor 500 via a stream 468 and flows to a $CO_2$/Methanol Reflux Accumulator 469. The vapor and liquid are separated in $CO_2$/Methanol Reflux Accumulator 469.

The liquid reflux flows from the Reflux Accumulator 469 to a $CO_2$/Methanol Reflux Pump 470 via an exit stream 485 and is pumped from pump 470 to the $CO_2$/Methanol Splitter 472 via an outlet stream 471.

The carbon dioxide vapor or gas exits the Accumulator 469 via a stream 482 to the inlet of a $CO_2$ Compressor 483 where the carbon dioxide is compressed to a pressure of 600 to 650 psia. The carbon dioxide exits the Compressor 483 in a stream 501 to cross-exchange with propane, freon or other suitable refrigerant (not shown in detail) in the $CO_2$-Refrigerant Exchanger 484. The carbon dioxide is condensed and exits the $CO_2$-Refrigerant Exchanger 484 via a stream 486 where it combines with stream 450 to form stream 487. Stream 487 exits the system as the liquid carbon dioxide product.

The $CO_2$/Methanol Splitter 472 bottoms exits in a stream 475 which is heated from 300° to 350° F. to a temperature of 320° to 380° F. by a $CO_2$/Methanol Splitter Reboiler 474. Steam or some other suitable means of heat is required for the $CO_2$/Methanol Splitter 474. Part of the fluid is vaporized and returned to the $CO_2$/Methanol Splitter 472 via a stream 473. The hot "lean" methanol liquid exits the $CO_2$/Methanol Splitter Reboiler 474 in a stream 476. The hot "lean" methanol is cooled to 120° F. by the Air Cooler 477 located at the outlet of stream 476. The cooled "lean" methanol exits Cooler 477 in a stream 478 and is subsequently cross-exchanged in the Lean-Rich Methanol Exchanger 462 with the "rich" methanol stream 461 to recover the refrigerated energy in stream 461.

The cooled "lean" methanol exits the Lean-Rich Methanol Exchanger 462 via a stream 479. The "lean" methanol in stream 479 is further refrigerated to a temperature level of 10° to $-35°$ F. by a Methanol Chiller 480 using an external refrigeration source such as freon or propane or other suitable refrigerant (not shown in detail). The chilled "lean" methanol flows from the Methanol Chiller 480 via a stream 481 to the top of the Methanol Absorber 496.

In operation, the methane, lighter components, together with most of the carbon dioxide and some ethane, in feed stream 401 are separated in $CO_2$-Splitter 412 from the propane-and-heavier hydrocarbons. Approximately fifteen to twenty percent of the incoming carbon dioxide and five to ten percent of the incoming ethane in feed stream 401 is distributed to the bottoms product in stream 491. The efficiency of the separation with respect to carbon dioxide and ethane distribution between the top and bottom products is not critical. An effective separation of the propane-and-heavier hydrocarbons from the methane-and-lighter components is important. The heavier hydrocarbons are difficult to separate from methanol. In fact, the pentane-and-heavier hydrocarbons would form an azeotrope with methanol. Fortunately, this separation is very easy to achieve. Because of this method of separation, the operating temperatures and pressure of $-40°$ to 0° F. and 300 to 400 psia in the $CO_2$-Splitter 412 are such that solidification of carbon dioxide will not occur.

The bottoms stream 491 from $CO_2$-Splitter 412 is fed to the NGL Tower 419. The ethane and carbon dioxide are distilled in the NGL Tower 419 as a top gas product at temperature of 0° to 30° F. If hydrogen sulfide is present, it will become a part of the ethane and carbon dioxide product. The NGL Tower 419 is operated at pressures of 300 to 500 psia. The bottom from the NGL Tower 429 is cooled to 120° F. to exit the system as a propane-and-heavier hydrocarbon product liquid in stream 439.

The overhead vapor from the $CO_2$-Splitter 412 in stream 417 and the overhead vapor from the NGL Tower 429 in stream 424 are combined and subsequently compressed by compressor 429 to a pressure of 600 to 650 psia. This compressed gas is a mixture of the ethane-methane-lighter components and carbon dioxide. This compressed vapor in stream 431 is essentially free of propane and heavier hydrocarbons.

This stream 431 is subsequently chilled and fed to the $CO_2$/Light Ends Separator Tower 495.

In the $CO_2$/Light Ends Separator Tower 495 the light ends comprising the methane and lighter components, roughly 35 to 40 percent of the ethane and 15 to 20 percent of the carbon dioxide, are separated from the remaining ethane and carbon dioxide as an overhead vapor stream 440. The bottoms ethane and carbon dioxide in stream 449 is recovered as a liquid product. This alternate embodiment permits recovery of the 80 percent of the carbon dioxide as a liquid product in stream 487 with an effective reduction in plant cost and utility requirements. This alternate embodiment is at some sacrifice in the recovery of the ethane. The ethane left in the carbon dioxide does not create any problems in the recovery of oil from existing oil reservoirs using this fluid as a misciable injectant. Additionally, in time, the ethane will be recycled to ultimately be recovered, The overhead gas product from the $CO_2$/Light Ends Separator Tower 495 containing methane, lighter components, carbon dioxide, and ethane in stream 444 is mixed with liquid in stream 451 withdrawn at the bottom chimney tray 496 of Methanol Absorber 455. The mixture is refrigerated to a temperature of $-40°$ to $0°$ F. This partially condenses the carbon dioxide which is absorbed or dissolved into the liquid methanol stream. The refrigeration removes the heat of solution or absorption and effectively reduces the "lean" methanol rate. The mixture is fed to the bottom of the Methanol Absorber 496 where the gas and liquid separate. The gas flows upward, countercurrent to the downcoming "lean" methanol fed at the top of the Methanol Absorber 496. This "lean" methanol in stream 481 has been chilled to a temperature of $0°$ to $-40°$ F. The "lean" methanol rate is based on a molal ratio of carbon dioxide to methanol of between two and three to one. The carbon dioxide is more soluble in methanol than methane or the lighter components. Consequently, the carbon dioxide is dissolved or absorbed in the "lean" methanol. The separated liquid leaves the bottom of the Methanol Absorber 496 as a liquid at temperatures of $10°$ to $20°$ F. above the inlet "lean" methanol. Hydrogen sulfide is also very soluble in methanol and if any is present it will be dissolved in the methanol. The "rich" methanol in stream 460 is partially cross-exchanged with the "lean" methanol in stream 478 to recover the cryogenic energy and warm the "rich" methanol.

The warmed "rich" methanol from the Methanol Absorber 496 in stream 499 is fed to the $CO_2$/Methanol Splitter 472. The carbon dioxide is distilled as an overhead product in stream 482 subsequently compressed and condensed to combine with the carbon dioxide product from the $CO_2$/Light Ends Separator Tower 495 in stream 450 as the total liquid carbon dioxide product in stream 487. The methanol bottoms product stripped of carbon dioxide and other hydrocarbons becomes the "lean" methanol. It is cooled at $120°$ F. and recycled to the system. The $CO_2$-Methanol Splitter 472 is operated at pressures of 300 to 400 psia with top temperatures of $-15°$ to $25°$ F. and corresponding bottoms temperatures $300°$ to $400°$ F.

Typical operating conditions, product distributions, and flow rates are illustrated in Table III.

TABLE III

E.O.R. $CO^2$ RECOVERY SYSTEM ALT-1
83% $CO^2$ V0L = 83.13

| STREAM NO<br>COMP | 1-TOW<br>FEED<br>401<br>MOL/H | 1-TOW<br>OVHD<br>417<br>MOL/H | NGL<br>FEED<br>492<br>MOL/H | NGL<br>OVHD<br>424<br>MOL/H | NGL<br>BTMS<br>437<br>MOL/H | COMB<br>FEED<br>428<br>MOL/H | COMB<br>FEED<br>430<br>MOL/H |
|---|---|---|---|---|---|---|---|
| N2   | 27.00   | 27.00   | 0.00    | 0.00    | 0.00   | 27.00   | 27.00   |
| C1   | 790.00  | 790.00  | 0.00    | 0.00    | 0.00   | 790.00  | 790.00  |
| CO2  | 7570.00 | 5887.50 | 1682.50 | 1671.30 | 11.20  | 7558.80 | 7558.80 |
| C2   | 290.00  | 275.46  | 14.54   | 14.14   | 0.40   | 289.60  | 289.60  |
| C3   | 240.00  | 19.91   | 220.09  | 6.59    | 213.50 | 26.50   | 26.50   |
| IC4  | 32.00   | 0.02    | 31.98   | 0.00    | 31.98  | 0.02    | 0.02    |
| NC4  | 78.00   | 0.00    | 78.00   | 0.00    | 78.00  | 0.00    | 0.00    |
| IC5  | 24.00   | 0.00    | 24.00   | 0.00    | 24.00  | 0.00    | 0.00    |
| NC5  | 24.00   | 0.00    | 24.00   | 0.00    | 24.00  | 0.00    | 0.00    |
| NC6  | 25.00   | 0.00    | 25.00   | 0.00    | 25.00  | 0.00    | 0.00    |
| MEOH | 0.00    | 0.00    | 0.00    | 0.00    | 0.00   | 0.00    | 0.00    |
| TOTAL | 9100.00 | 6999.89 | 2100.11 | 1692.03 | 408.08 | 8691.92 | 8691.92 |
| TEMP-F | 102   | −2.3    | 18      | 8       | 188    | 0       | 48      |
| PRES-PSIA | 368 | 350   | 358     | 350     | 354    | 350     | 630     |

| STREAM NO<br>COMP | 3-TOW<br>OVHD<br>444<br>MOL/H | 3-TOW<br>BTMS<br>450<br>MOL/H | LEAN<br>MEOH<br>481<br>MOL/H | ABS<br>OVHD<br>456<br>MOL/H | ABS<br>BTMS<br>460<br>MOL/H | CO2<br>OVHD<br>482<br>MOL/H | MEOH<br>BTMS<br>476<br>MOL/H | TOT<br>CO2<br>487<br>MOL/H |
|---|---|---|---|---|---|---|---|---|
| N2   | 27.00   | 0.00    | 0.00    | 27.00   | 0.00    | 0.00    | 0.00    | 0.00    |
| C1   | 774.28  | 15.72   | 0.00    | 755.46  | 18.82   | 18.82   | 0.00    | 34.54   |
| CO2  | 1116.50 | 6442.30 | 10.00   | 0.93    | 1125.57 | 1114.20 | 11.37   | 7556.50 |
| C2   | 105.48  | 184.12  | 0.00    | 80.06   | 25.42   | 25.31   | 0.11    | 209.43  |
| C3   | 1.75    | 24.75   | 0.00    | 1.13    | 0.62    | 0.62    | 0.00    | 25.37   |
| IC4  | 0.00    | 0.02    | 0.00    | 0.00    | 0.00    | 0.00    | 0.00    | 0.02    |
| NC4  | 0.00    | 0.00    | 0 00    | 0.00    | 0.00    | 0.00    | 0.00    | 0.00    |
| IC5  | 0.00    | 0.00    | 0.00    | 0.00    | 0.00    | 0.00    | 0.00    | 0.00    |
| NC5  | 0.00    | 0.00    | 0 00    | 0.00    | 0.00    | 0.00    | 0.00    | 0.00    |
| NC6  | 0.00    | 0.00    | 0.00    | 0.00    | 0.00    | 0.00    | 0.00    | 0.00    |
| MEOH | 0.00    | 0.00    | 1000.00 | 0.28    | 999.72  | 0.05    | 999.67* | 0.05    |
| TOTAL | 2025.01 | 6666.91 | 1010.00 | 864.86  | 2170.15 | 1159.00 | 1011.15 | 7825.91 |
| TEMP-F | −1    | 44      | −10     | −10     | −10     | 15      | 346     | 44      |
| PRES-PSIA | 615 | 623   | 610     | 610     | 610     | 375     | 381     | 623     |

*Methanol make-up is 0.38 16-MOLE/HR
The above is computer calculated.

The advantage of the art disclosed by the first embodiment process over the Ryan/Holmes separation system discussed in the "Background" also applies for this alternate embodiment in that no solid formation of carbon dioxide will take place in the distillation and absorption separation systems described herein because the minimum temperature required is $-40°$ F. which is well above the freezing point of carbon dioxide. Further at this level of temperature and above, all of the materials of construction for the distillation and absorption system may be carbon steel, which reduces the plant cost, Also, the methanol is a polar molecule used to absorb the carbon dioxide and hydrogen sulfide from the ethane-methane-and-lighter components. The methanol serves to invert the relative volatility of carbon dioxide to ethane and maintain it well above one. Based on this fact, the methanol not only prevents the potential formation of the carbon dioxide-ethane azeotrope but permits the separation of the ethane-methane-and-lighter components from the dissolved carbon dioxide in the methanol.

A comparison of capital cost and energy consumption may also be made with the first embodiment and Ryan/Holmes process, for which information is taken from the data in the Holmes, et al, U.S. Pat. No. 4,462,814, issued July 31, 1984 and from information abstracted from the Proceedings of the Sixty-First Gas Processors Associates Meeting Papers, presented Mar. 5–17, 1982, "Comparison of Processes for Treating Gases with High $CO_2$ Content" by Clifton S. Goodin.

A simulation of the Ryan/Holmes process was performed and adjusted until it met the performance described in the "Goodin" paper. This was necessary to assure that the process method used for the Ryan/Holmes process simulation was accurate. After the method was established, the process simulation was repeated with feed gas illustrated in Table IV. From this, the equipment was specified and priced. The methanol process for both the first and alternate embodiments were similarly simulated: equipment was also specified and priced.

The capital cost and overall utility requirements are illustrated in Table IV.

TABLE IV

| CAPITAL COST AND UTILITIES | | | |
|---|---|---|---|
| | (1) BHP | (2) BHP | (3) BHP |
| UTILITIES | | | |
| Compressors | 22,580 | 24,790 | 17,889 |
| Fans, Pumps, etc. | 3,050 | 1,480 | 2,290 |
| Total | 25,630 | 26,270 | 20,179 |
| FUEL-GAS | MSCFD | MSCFD | MSCFD |
| Compressors | 4,880 | 5,430 | 3,870 |
| Heating | 3,320 | 2,610 | 940 |
| Total | 8,100 | 8,040 | 4,810 |
| CAPITAL COST | $(000) | $(000) | $(000) |
| Plant Cost | 17,680 | 13,710 | 13,500 |
| Comp. Cost | 20,322 | 22,311 | 16,100 |
| Total | 38,002 | 36,021 | 29,600 |

(1) Ryan/Holmes Process
(2) Methanol Process - First Embodiment
(3) Methanol Process - Alternate Embodiment
Heating Fuel based on 85% efficiency and 1,000 BTU/SCF Compressor Fuel based on 9,000 BTU/BHP.

Based on Table IV information, the Ryan/Holmes process consumed twenty-seven percent more mechanical equipment horsepower and approximately sixty-eight percent more fuel gas.

Despite the fact that five towers and related equipment are required for the present process versus the Ryan/Holmes system that only uses three units, the Ryan/Holmes process costs twenty-eight percent more.

The major difference in cost is due to the fact that no stainless steel materials are required in the present process and the distillation and absorption towers are much smaller and the compression costs are less.

Because many varying and different embodiments may be made within the scope of the inventive concept herein taught including equivalent structures or materials or heat and cooling media and techniques hereafter thought of. For example, instead of methanol as the polar compound, other polar alcohols, such as ethanol and acetone, could be used. Because many modifications may be made in the embodiments herein detailed in accordance with the descriptive requirements of the law, it is be understood that the details herein are to be interpreted as illustrative nd not in a limiting sense.

What is claimed as invention is:

1. A process for removing carbon dioxide from a feed stream of natural gas having at least methane, ethane and heavier comprising:
   A. first, separating the feed stream in a first separator to form a first stream having substantially all of the propane and heavier hydrocarbons and carbon dioxide and ethane and a second stream, having methane, carbon dioxide and ethane:
   B. separating the second stream in a second separator into a stream of carbon dioxide product and a third stream having ethane, methane and carbon dioxide:
   C. mixing at least a portion of the third stream with a polar compound; stream after said mixing in an absorber;
   D. separating the vapor and liquid of the third stream after said mixing in an absorber;
   E. absorbing the remaining unabsorbed carbon dioxide of Step D in a lean portion of the polar compound in the absorber, the absorbed carbon dioxide and ethane with the polar
   F. separating the first stream in a third separator to separate the propane and heavier hydrocarbons from the carbon dioxide and ethane, which carbon dioxide and ethane forms a fifth stream; and
   G. separating the polar compound/carbon dioxide effluent of the absorber in a fourth separator, to separate the carbon dioxide from the polar compound, the polar compound forming a sixth stream.

2. The process of claim 1, wherein prior to step A, there is included the step of recovering refrigeration energy by indirect heat exchanging product streams with the feed stream.

3. The process of claim 2, wherein the product streams include at least a heavier hydrocarbon stream and a methane stream.

4. The process of claim 1, wherein the polar compound is methanol.

5. The process of claim 4, wherein the mixture of Step C is chilled to cause carbon dioxide and ethane which are present in the third stream to condense and dissolve in the methanol.

6. The process of claim 1, wherein prior to Step A the feed stream is chilled to a temperature of 50° to −30° F. in a chiller.

7. The process of claim 6 wherein the pressure of the chilled feed stream is reduced to 350 to 400 psia and the first separator operates at a pressure at 300 to 400 psia and a temperature of −40° to 0° F.

8. The process of claim 1, wherein there is included in Step A the step of cooling the second stream to a temperature of 0° to −30° F.

9. The process of claim 1, wherein Step B includes the step of chilling the second stream to a temperature of −10° to 20° F.

10. The process of claim 1, wherein the lean polar compound of step E is fed to the absorber at a temperature of −35° to 10° F.

11. The process of claim 1, wherein in Step E the lean polar compound rate is adjusted on the basis of absorbing the carbon dioxide and rejecting the methane-and-lighter components.

12. The process of claim 11, wherein the molal ratio of the polar compound to carbon dioxide is between two and three to one polar compound to carbon dioxide.

13. The process of claim 12, wherein the absorber is operated at pressures of 500 to 650 psia.

14. The process of claim 1, wherein the effluent gas from Step E includes substantially only methane-and-lighter components at temperatures of $-10°$ F. to 25° F. above the temperature of the lean polar compound introduced to the absorber.

15. The process of claim 1, wherein the fourth stream is reduced in pressure to 300 to 500 psia before being introduced into the fourth separator.

16. The process of claim 1, wherein the fourth separator operates at a pressure of 300 to 500 psia.

17. The process of claim 16, wherein the sixth stream is indirectly heat exchanged with a portion of the fourth stream to reduce the temperature of the sixth stream to $-10°$ to 20° F.

18. The process of claim 1, wherein the second and fifth stream are combined and compressed to a pressure of 600 to 650 psia and refrigerated to a temperature of $-10°$ to 20° F.

19. The process of claim 1, wherein the third separator operates at a pressure of 300 to 500 psia.

20. The process of claim 1, wherein the third stream is condensed and prior to being condensed is mixed with a portion of the polar compound.

21. The process of claim 1, wherein the bottom effluent of the absorber is indirectly heat exchanged with the sixth stream to recover heat energy from the sixth stream.

22. The process of claim 1, wherein the fourth separator operates at a pressure of 300 to 400 psi.

23. The process of claim 1, wherein the feed stream to the fourth separator is at a temperature of 120° F., or less, 24. The process of claim 1, wherein the sixth stream is the supply of substantially all of the lean polar compound.

25. The process of claim 1, wherein the lean polar compound is chilled to a temperature of $-10°$ to 20° F. before entering the absorber.

26. The process of claim 1, wherein there is further included hydrogen sulfide in the feed stream and the hydrogen sulfide is dissolved in the fourth stream.

27. A process for removing carbon dioxide from a feed stream of natural gas, having at least methane, ethane, carbon dioxide and heavier hydrocarbons, comprising:
A. separating the feed stream into a Stream 1 substantially all of the propane and heavier hydrocarbons components and into a Stream 2 substantially all the methane and lighter gases, both Streams 1 and 2 having other components including ethane;
B. separating the components of Stream components other than propane and heavier components forming Stream 3;
C. separating Stream 2 to remove some carbon dioxide;
D. Absorbing the other components from Stream 2 after Step C and all of Stream 3 in a lean polar compound, the components, other than methane and lighter gases forming Stream 4;
E. Separating the ethane and carbon dioxide from the rest of Stream 4.

28. Apparatus for the removal of carbon dioxide from a feed stream of natural gas, having at least methane, ethane, carbon dioxide and heavier hydrocarbons, comprising:
first means for separating the feed stream into a Stream 1 having substantially all of the propane and heavier hydrocarbons and a Stream 2 having substantially all the methane and lighter gases, both of said Streams 1 and 2 having with other components including ethane:
second means for separating Stream 2 to remove some of the carbon dioxide;
third means for separating components of Stream 1, the components other than propane and heavier components forming a Stream 3;
fourth means including a polar compound for absorbing said other components from said Stream 2 and Stream 3, said other components forming a Stream 4;
fifth means for separating said components of said Stream 4 from the rest of said Stream 4.

29. A process for removing carbon dioxide from a feed stream of natural gas, having at least methane, ethane and heavier hydrocarbon, comprising:
A. first, separating the feed stream in a first separator to form a first stream, having substantially all of the propane and heavier hydrocarbons and carbon dioxide and ethane. and a second stream, having methane, carbon dioxide and ethane;
B. mixing the second stream with a polar compound to form a third stream;
C. separating the vapor and liquid of the third stream in an absorber;
D. absorbing carbon dioxide and ethane from the separated vapor of Step C in a lean portion of the polar compound in the absorber, the absorbed carbon dioxide and ethane forming a fourth stream;
E. separating the ethane from the polar compound and carbon dioxide in a third separator;
F. separating the first stream in a fourth separator to separate the propane and heavier hydrocarbons from the carbon dioxide and ethane, which carbon dioxide and ethane forms a fifth stream; and
G. separating the polar compound/carbon dioxide effluent of the second separator after separation in the third separator in a fourth separator to separate the carbon dioxide from the polar compound, the polar compound forming a sixth stream.

* * * * *